July 3, 1956 — V. R. CIOFFI — 2,753,302
WATER TREATING SYSTEM
Filed Feb. 1, 1954

INVENTOR
Vincent R. Cioffi
BY
ATTORNEY

2,753,302

WATER TREATING SYSTEM

Vincent R. Cioffi, Hasbrouck Heights, N. J., assignor to Bogue Electric Manufacturing Co., Paterson, N. J., a corporation of New Jersey Application February 1, 1954, Serial No. 407,204

2 Claims. (Cl. 210—24)

This invention relates to water treating systems and more particularly to systems using anion and cation exchange resins in a monobed arrangement.

In conventional monobed ion exchange resin systems, the separation of the anion and cation exchange resins during the backwashing operation leaves the lighter anion resin resting on the heavier cation resin, all within a single chamber. The interfacial zone between the two resins is not too sharply defined, which reduces the efficiency of the regenerating operations and otherwise impairs the efficiency of the cyclical operations of the water treating unit.

Accordingly, an object of this invention is to provide a water treating system of the type described wherein the anion and cation resins are positively segregated from each other by the backwashing operation, the segregated resins being independently further backwashed at a water flow rate limited in accordance with the density of said resins and independently regenerated.

Another object of this invention is to provide a water treating unit having one chamber for holding a monobed of mixed anion and cation exchange resins during the service operation and the initial portion of the backwashing operation; and a second chamber for holding the lighter anion resin removed from the first chamber during the latter portion of the backwashing operation, the resins in the respective chambers being independently further backwashed, regenerated and rinsed, the segregated resins then being recombined and mixed in the first chamber for resumption of the water treating cycle.

Other objects of this invention will in part be obvious and in part hereinafter pointed out.

Figure 1:
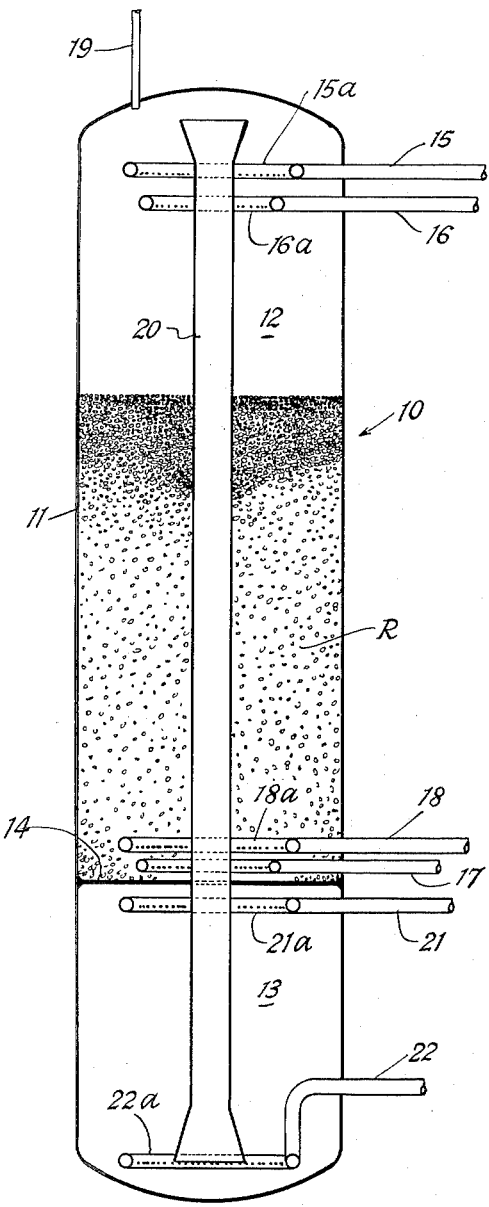
Figure 2:
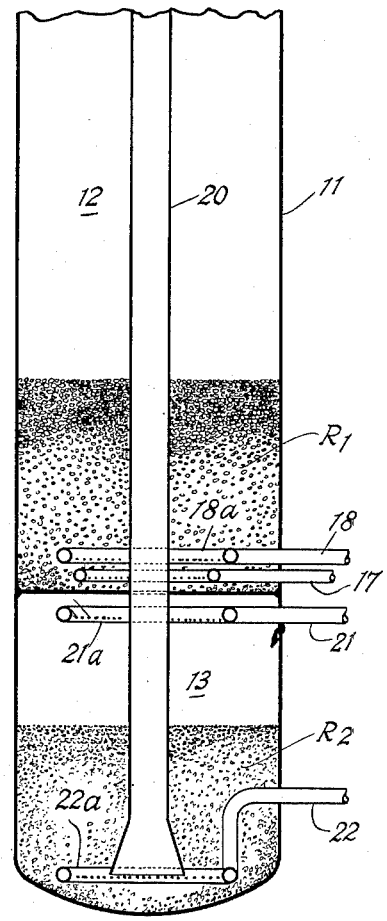

In the drawings, Fig. 1 is a vertical sectional view of a water treating unit embodying the invention, showing the exchange resins in mixed form; Fig. 2 is a partial vertical sectional view similar to that of Fig. 1 but showing the resins in segregated relation.

The invention disclosed herein, essentially comprises a container having upper and lower, segregated chambers with an elongated conduit within the container interconnecting the chambers, each chamber being provided with appropriate inlet and outlet connections for admitting raw water, wash water and regenerants and removing softened water and waste; the upper chamber being further provided with an air inlet, whereby a mixture of anion and cation exchange resins of differential density may be located in the upper chamber during service, the resins being separated and the lighter resin being carried by means of the conduit to the lower chamber to allow the resins to be independently washed and regenerated, the conduit further permitting the separated resins to be recombined in the upper chamber.

Referring in detail to the drawing, 10 designates a water treating unit embodying the invention which comprises a cylindrical tank or container 11, the interior thereof being divided into an upper chamber 12 and a lower chamber 13 by means of a horizontal partition plate 14.

A combined raw water inlet and backwash outlet 15 is provided at the upper end of chamber 12, terminating in a distributing head 15a. An acid regenerant inlet 16 is located below inlet 15 and terminates in a distributing head 16a. An air inlet 17 is located at the bottom of chamber 12 and a combination service and waste outlet and backwash inlet 18 is located immediately above inlet 17 and terminates in a header 18a. An air outlet 19 is provided at the upper end of chamber 12.

A vertically positioned and centrally located downcomer pipe 20 connects chambers 12, 13; the pipe passing through a suitable opening in plate 14 and having the opposite ends thereof located adjacent the opposite ends of the container 11. A combination alkali regenerant inlet, water inlet and waste outlet 21 is located at the upper end of lower chamber 13, terminating in a header 21a. A combination rinse and regenerant outlet and backwash inlet 22 is located at the lower end of said chamber 13, terminating in a header 22a.

The several inlets and outlets are suitably valved and are adapted to be properly connected to a raw water supply, service supply, acid regenerant supply, alkali regenerant supply, waste line and air supply, the valves being operated to suit the cyclical operation of the unit, in a manner known in the art.

At the beginning of each water treating cycle, a mixture of relatively heavy cation exchange resin and lighter anion exchange resin, indicated generally at R, is located within chamber 12 and being supported on partition plate 14. Such resins are well known in the art and are provided in suitably granulated form.

Raw water is admitted to the unit at inlet 15 and is distributed over the resin bed R by header 15a, the water being treated as it passes through said resin bed and the treated water leaves the unit by way of header 18a and service outlet 18.

After a predetermined interval of water treatment, the resins must be regenerated. Accordingly, by means of valves not shown, water is admitted to the bottom of chamber 12 by way of backwash inlet 18 and rises through the bed of resin to backwash the same. The backwash water passes from chamber 12 to chamber 13 by way of pipe 20 and leaves the unit 11 by way of outlet 21.

During an initial portion of the backwashing operation, the flow of water is sufficiently low to effect hydraulic separation of the two resins within chamber 12. Thereafter, the water flow is increased so as to carry the lighter anion resin into the lower chamber 13 by way of pipe 20, thereby completely segregating the heavier cation resin from the lighter anion resin in the separate chambers.

After segregation of the resins, they can be further backwashed in their respective chambers at a water flow rate suited to the densities of the resins. Thus, the backwash water entering chamber 12 by way of inlet 18 and leaving by way of outlet 15, has a somewhat higher rate of flow than the backwash water entering chamber 13 by way of inlet 22 and leaving by way of outlet 21. In this way, the segregated resins may be thoroughly backwashed to insure maximum removal of deleterious matter coating the resin granules.

Upon completing the backwash operation, the resins are ready for regeneration. Accordingly, acid regenerant is admitted to chamber 12 by way of inlet 16 and header 16a, passes through the cation exchange resin $R_1$ indicated in Fig. 2, to regenerate the same and leaves the unit by way of header 18a and waste outlet 18. Alkali regenerant is supplied to chamber 13 by way of inlet 21 and header 21a, passes through the anion exchange resin $R_2$ indicated in Fig. 2, to regenerate the same and leaves the unit by way of header 22a and outlet 22. Thus, the regeneration of both resins can be accomplished simultaneously without contact of the two incoming regenerants or the outgoing wastes.

The regenerated cation resin in chamber 12 is rinsed with water entering the chamber through inlet 15 and leaving by outlet 18. The regenerated anion resin in chamber 13 is rinsed with water entering the chamber through inlet 21 and leaving by outlet 22.

The segregated, regenerated resins $R_1$, $R_2$ must now be recombined and thoroughly mixed for use in the service operation of the water treating cycle. Accordingly, water is admitted to the lower chamber 13 by way of inlet 21, passes to the upper chamber 12 by way of pipe 20 and leaves the unit by way of outlet 18. The rate of flow of this water should be sufficiently high to enable it to carry with it the anion exchange resin $R_2$ from lower chamber 13 to the upper chamber 12.

Simultaneously, air is admitted to chamber 12 by way of inlet 17 and in counterflow relation to the water flow, which produces a thorough mixing of the two resins within chamber 12 to provide the single monobed of resins R ready for resumption of the water treating cycle.

With the anion and cation exchange resins segregated from each other, more thorough backwashing can be effected and more efficient regeneration can be realized, thereby providing the granular resins in a more effective condition for treating the raw water at the beginning of each cycle of operation.

As various changes might be made in the embodiment of the invention herein set forth without departing from the spirit thereof, it is understood that all matter herein set forth is to be interpreted as illustrative and not in a limiting sense.

Having thus disclosed my invention, I claim as new and desire to protect by Letters Patent:

1. In a water treating unit utilizing cation and anion exchange resins of differential density, a container having upper and lower end walls and a partition plate therein for dividing said container into upper and lower chambers, water and regenerant inlets and waste outlets on each chamber, an air inlet at the lower end of said upper chamber, said partition plate being adapted to support a bed of mixed anion and cation exchange resins in said upper chamber during service operation, elongated conduit means passing through said partition plate and interconnecting said chambers, said conduit means having terminal portions adjacent said end walls and being operative in response to a flow of water therethrough in one direction to convey the anion resin from the upper chamber to the lower chamber thereby permitting independent backwashing and regeneration of the segregated resins, said conduit means being operative in response to a flow of water therethrough in the opposite direction to reconvey said anion resin from the lower chamber to the upper chamber for admixture with the cation resin therein.

2. A water treating unit utilizing cation and anion exchange resins of differential density comprising a container having upper and lower end walls, partition means for forming segregated chambers in said container, conduit means passing through said partition means and having terminal portions at the opposite ends thereof respectively spaced from said end walls of said container, combined raw water inlet and backwash outlet means and acid regenerant inlet means at the upper end of the upper chamber, combined backwash inlet, service and waste outlet means at the lower end of the upper chamber, air inlet means at the lower end of the upper chamber, alkali regenerant inlet and backwash outlet means at the upper end of the lower chamber and backwash inlet and waste outlet means at the lower end of the lower chamber.

References Cited in the file of this patent

UNITED STATES PATENTS

| | | |
|---|---|---|
| 322,103 | Hyatt | July 14, 1885 |
| 1,541,921 | Caps | June 16, 1925 |
| 1,624,614 | McGill | Apr. 12, 1927 |
| 1,763,783 | Hodkinson | June 17, 1930 |
| 2,461,505 | Daniel | Feb. 15, 1949 |
| 2,461,506 | Daniel | Feb. 15, 1949 |
| 2,578,937 | Kunin et al. | Dec. 18, 1951 |
| 2,578,938 | Kunin et al. | Dec. 18, 1951 |
| 2,628,192 | Ziegelman | Feb. 10, 1953 |
| 2,666,741 | McMullen | Jan. 19, 1954 |